INVENTOR.
Bonifác Martinák
BY
Michael S. Striker
Attorney

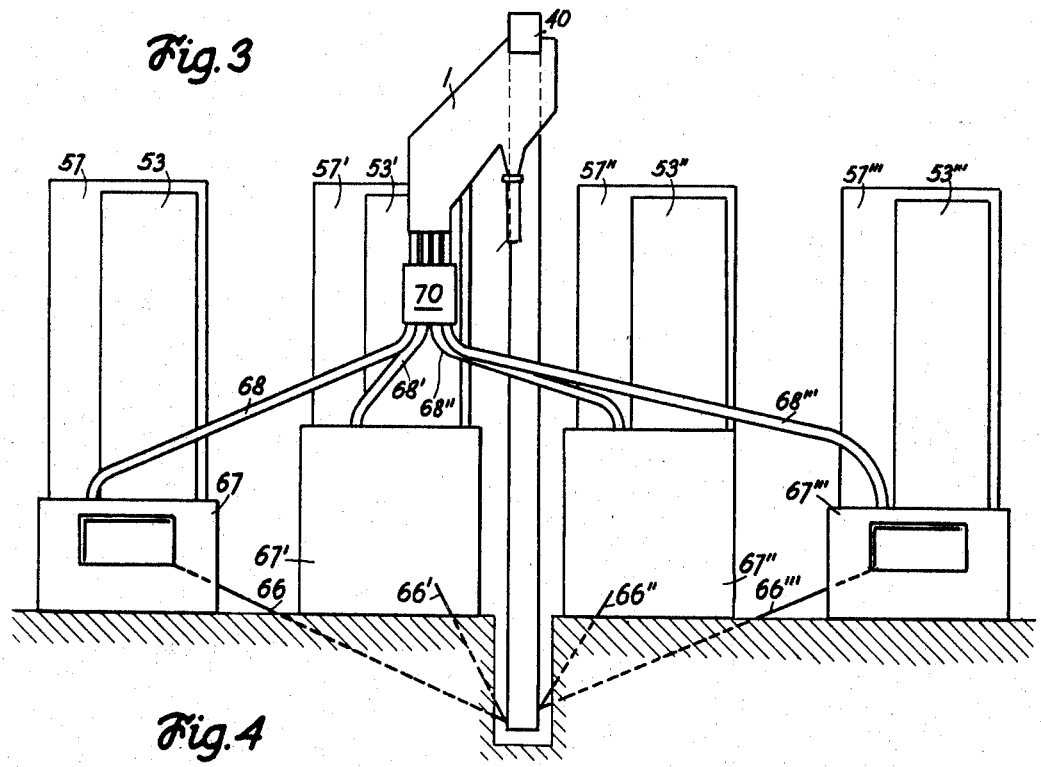
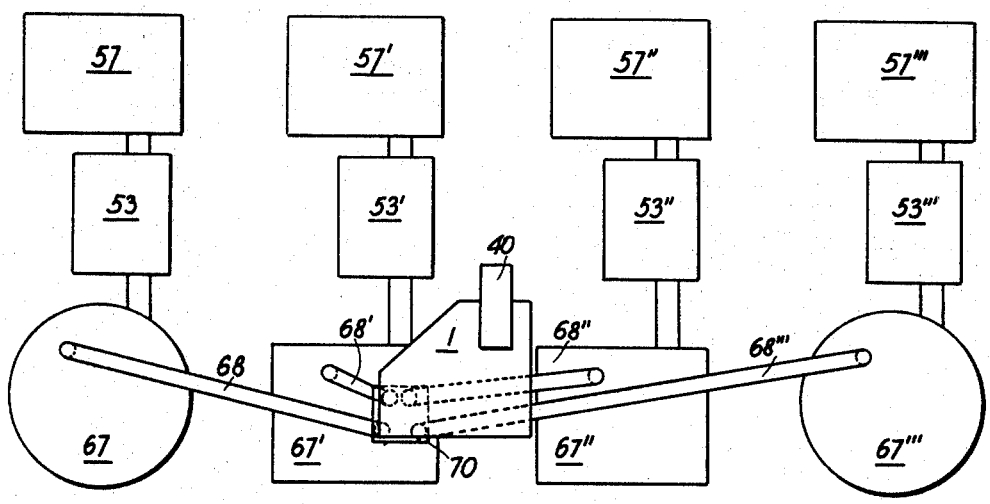

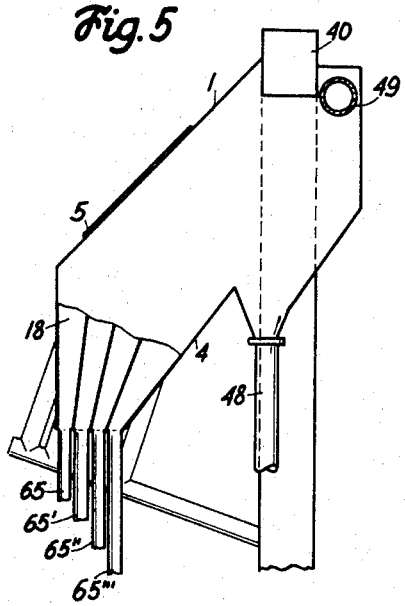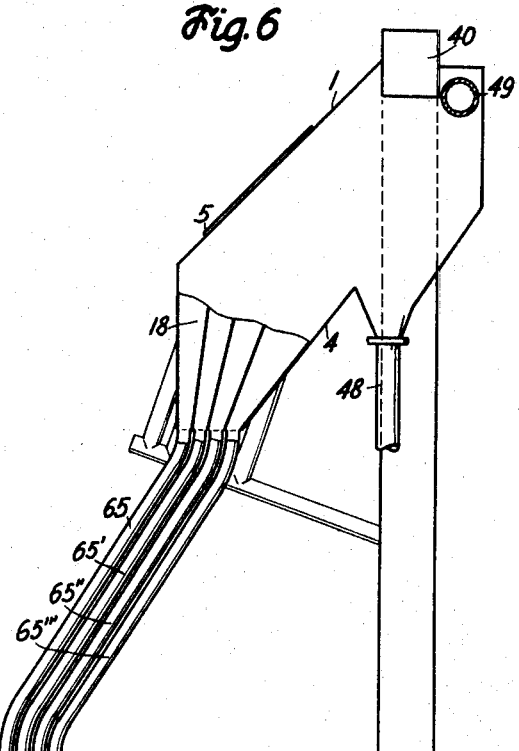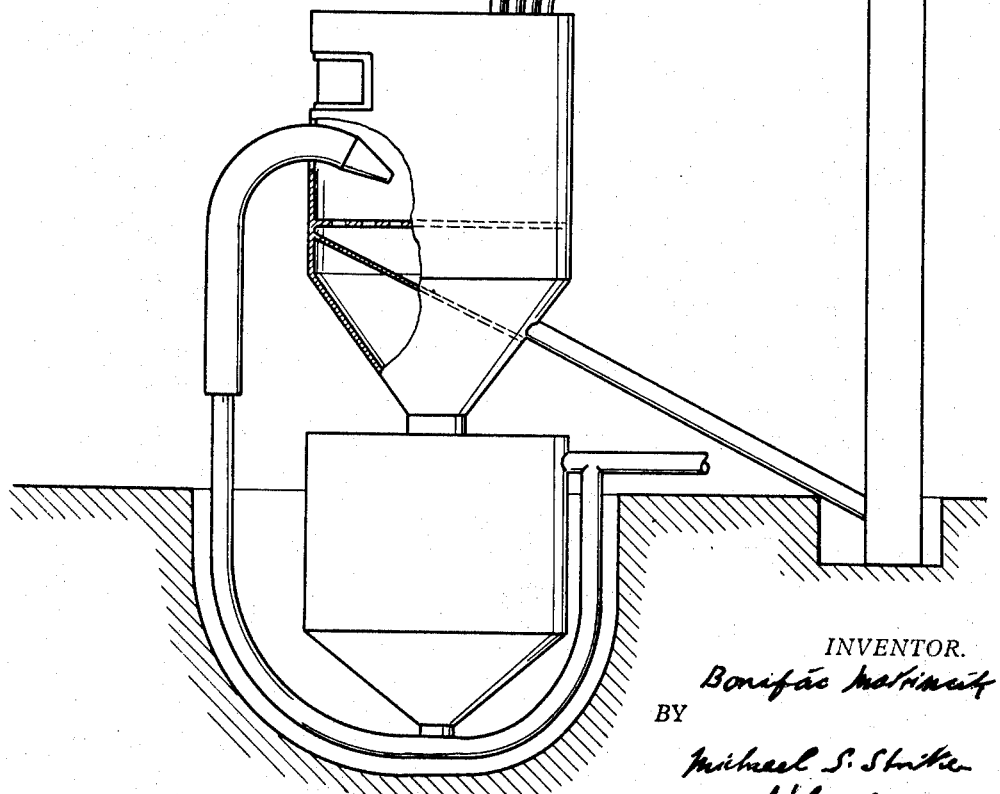

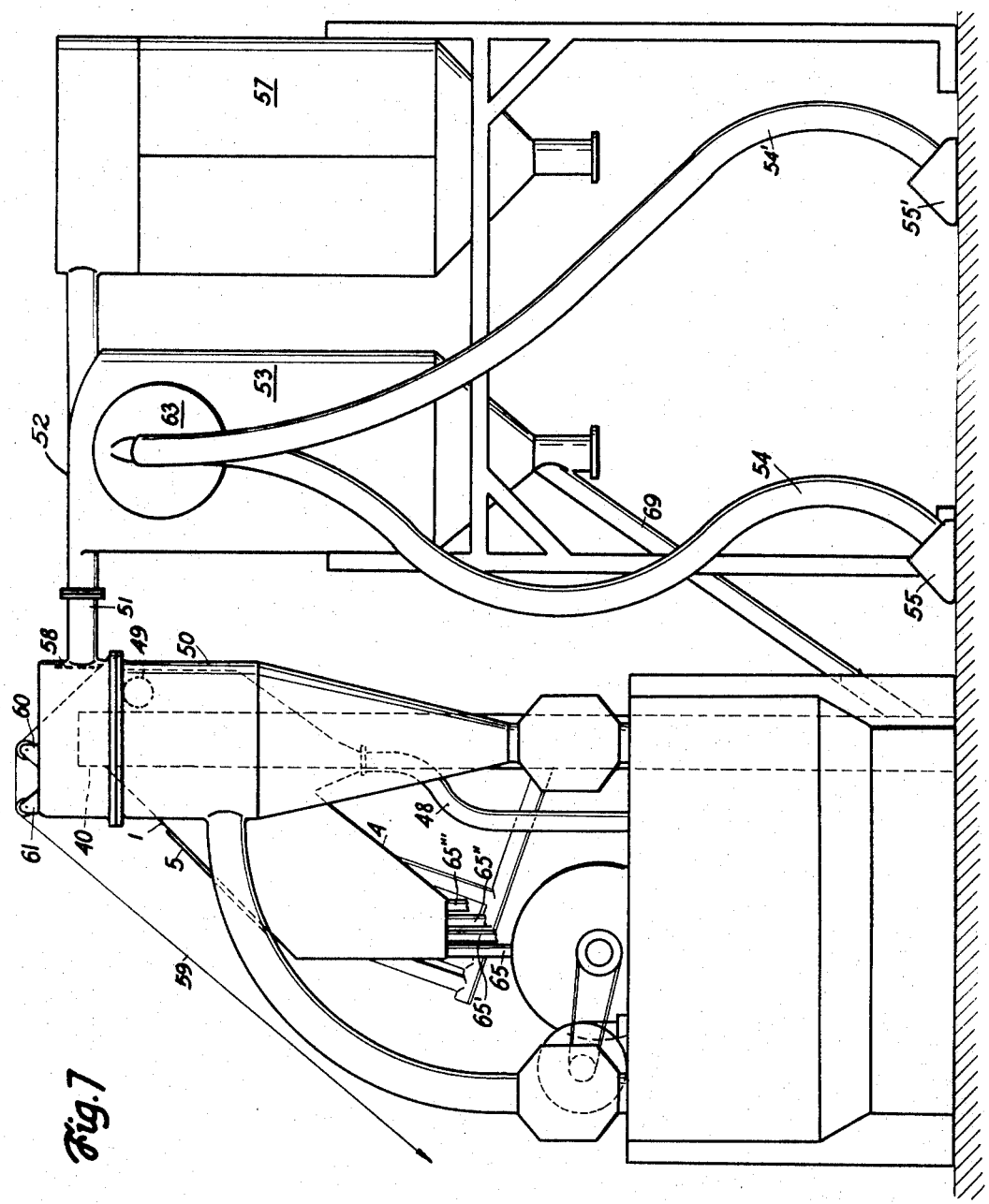

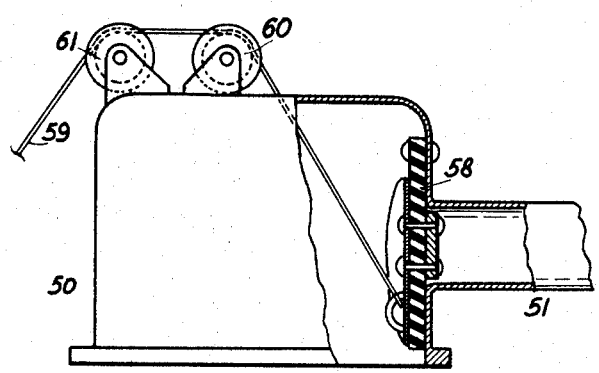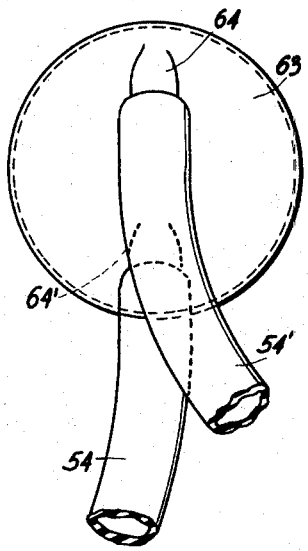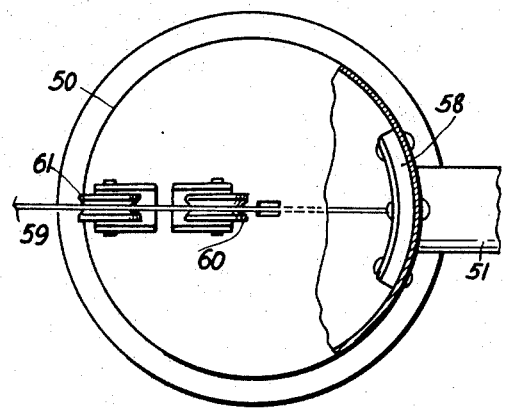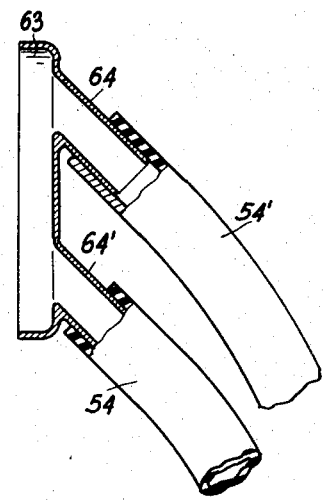

United States Patent Office 3,386,573
Patented June 4, 1968

3,386,573
APPARATUS FOR CONTINUOUS RECOVERY AND SEPARATION AND CLEANING OF GRIT
Bonifác Martinák, Prostejov, Czechoslovakia, assignor to Agrostroj Prostejov, Narodni Podnik, Prostejov, Czechoslovakia
Filed Feb. 21, 1967, Ser. No. 617,521
17 Claims. (Cl. 209—31)

ABSTRACT OF THE DISCLOSURE

Apparatus for the recovery and cleaning of grit used in the grit-blasting of metal objects which accomplishes the separation of contaminants from the grit particles by repeatedly passing the grit to be cleaned in a thin layer through a cleaning hopper and subjecting it therein to the separating action of an airstream, whereupon the airstream and material entrained thereby is itself subjected to further treatment for recovering grit particles entrained together with the contaminants.

Background of the invention

This invention relates to apparatus for the continuous recovery, separation and cleaning of grit used in blasting metal objects, and more particularly to such apparatus wherein currents of air are used for separating and cleaning the grit.

Grit used in grid blasting machines becomes admixed with dust and other impurities which make is unsuitable for further use. It is therefore necessary to clean the used grit by separating these impurities therefrom.

Apparatus is known for this purpose in which a bucket conveyor carries contaminated grit from a grit blasting machine to a cleaning hopper having means for distributing the mixture of grit and impurities in a more or less uniform layer therein. Thereupon, the mixture is caused to fall freely in layer form from one to another surface provided in the hopper, and a stream of air is directed through the layer of grit as it falls so as to thereby separate the lighter impurities from the heavier grit particles.

However, since the layer through which the air current passes is relatively thick, the cleaning effect of the air is not sufficient for removing the impurities mixed with the grit particles to the desired degree so that the grit is not properly cleaned. On the other hand, the grit consists of a mixture of fine and coarse particles and at least some of the finer particles are always removed from the hopper by the air stream, together with such impurities as are in fact separated out. These fine grit particles are usually not recoverable and therefore wasted, adding to the inefficiency of the apparatus the further drawback of economic losses.

To overcome these disadvantages it has been suggested to improve the cleaning effect by repeated circulation of the grit and dust mixture through the cleaning hopper, or to equip the cleaning apparatuses with devices which are intended to reduce the thickness of the layer of grit and dust, to thereby facilitate penetration of the air therethrough and hopefully to increase the cleaning effect of the air stream. This, however, has not been found satisfactory because of the necessary size and complexity of the machine which make initial expenditures and subsequent maintenance costs so high that the recovery process loses all economic feasibility. Furthermore, even these solutions do not overcome the originally mentioned disadvantages, namely inadequate dust separation and undesired losses of fine-particle grit.

Also, all machines of this type known to me from the prior art eject a considerable quantity of grit and dust particles of all sizes during their operation and such particles which are deposited in the vicinity of the machine and subsequently removed as waste, provide highly objectionable conditions on the working site, and may, over a period of time, even imperil the health of an operator.

Summary of the invention

It is therefore a general object of the present invention to provide a novel and effective apparatus for recovery, separation and cleaning of grit which will overcome the above-mentioned shortcomings of presently available apparatus.

A further object of the invention is to provide an apparatus which will receive partly cleaned grit particles, screen-sort such particles, air-clean the sorted particles, and deliver them to blasting machines or permit their selective withdrawal.

Another object of the invention is to provide a grit recovery-separation and cleaning apparatus of small size occupying little floor space, which does not require additional devices to spread the contaminated grit thinly within the cleaning hopper.

Still another object of the invention is to insure that the mixture of grit and contaminants, that is to say grit particles of varying size mixed with dirt and dust, will not be discharged from the machine and deposited in the vicinity thereof as objectionable deposits at the work site.

Yet another object of the invention is to prevent the waste of the finest usable grit particles and to assure their recovery.

Still another object of the invention is to provide a grit cleaning and recovering apparatus which is inexpensive to manufacture, simple to operate, and easy to maintain.

Other objects and advantages of the invention will become apparent from the following description taken together with the accompanying drawings.

According to the present invention, the mixture of grit and dust coming from one or more grit-blasting machines, is air-cleaned in a cleaning hopper in which it passes over a plurality of graduated sorting screens. From the sorting screens, cleaned grit moves into collecting channels which permit selective withdrawal of some of the cleaned grit from the hopper for further blasting. The hopper is continuously supplied by a recirculating means with uncleaned mixture, as well as with such cleaned grit as is in excess of the blasting-machine requirements and with those of the heavier grit particles which did not pass through the screens in a previous cleaning cycle and were carried along by the air stream.

The dust and impurities separated out by the screening process, together with such lighter grit particles as are carried past the screens by the air stream together with the dust and impurities, are fed to a first vortex separator, where the heavier of the light grit particles are separated and channelled to the grit-blasting machine; the remaining grit particles, together with the dust and impurities, pass on to a second vortex separator, in which they are finally separated from the dust and impurities which latter are discharged into a cyclone and from there to a waste deposit area.

The novel features which are considered as characteristic for the invention are set forth in particular in the appended claims. The invention itself, however, both as to its construction and its mode of operation, together with additional objects and advantages thereof, will be best understood from the following detailed description of specific embodiments when read in connection with the accompanying drawings.

Brief description of the drawing

FIG. 3 is a diagrammatic illustration, showing in elevation the apparatus according to the invention as used in connection with a plurality of grit blasting machines;

FIG. 4 is a plan view of the apparatus illustrated in FIG. 3;

FIG. 5 illustrates diagrammatically a modified embodiment of the feed hopper shown in FIG. 1;

FIG. 6 illustrates diagrammatically in elevation the apparatus as used in connection with a grit blasting machine of the nozzle type;

FIG. 7 is a diagrammatic elevation showing the vortex separators and the cyclone used in the present invention, together with suction hoses for cleaning the environmental area in which the apparatus is used;

FIG. 8 is a schematic vertical section through a part of the first vortex separator, showing a detail of the suction pipe closure;

FIG. 9 is a plan view of the arrangement in FIG. 8;

FIG. 10 is an elevation showing a detail of the connection of the suction hoses to the second vortex separator; and FIG. 11 is a section taken on the line XI—XI of FIG. 10, showing the connection of the connecting tubes with the outer part of the removable cover of the second vortex separator.

Description of the preferred embodiments

Figure 1:
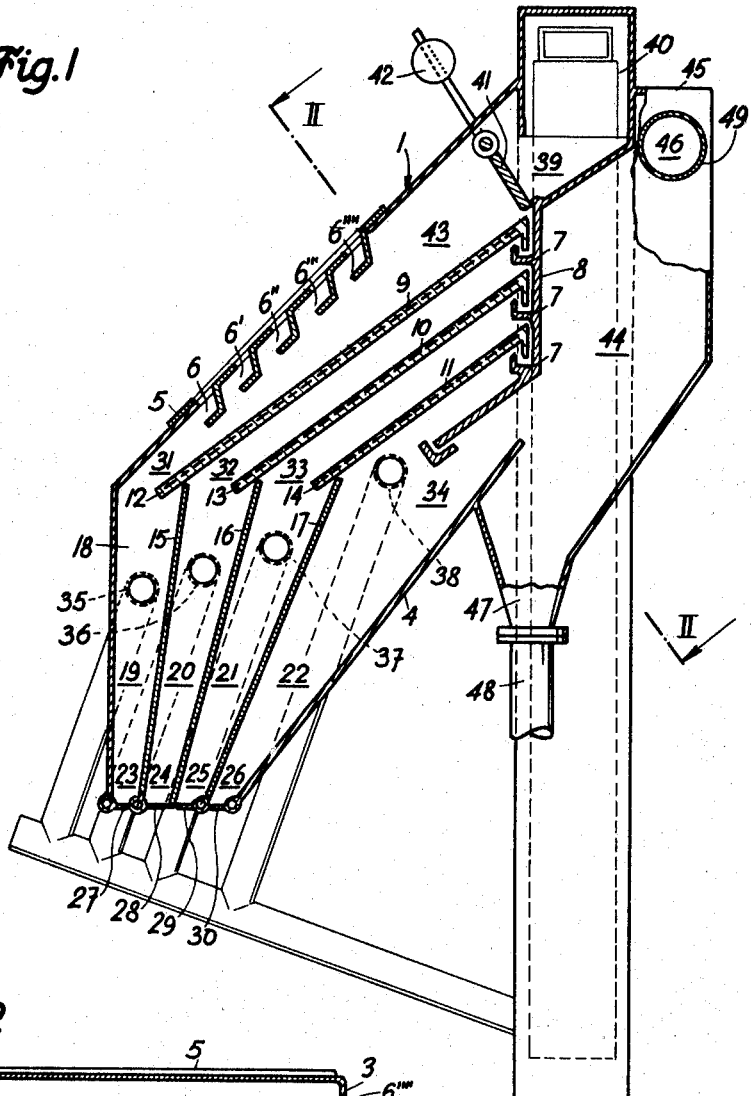
FIG. 1 is a diagrammatic vertical section through an apparatus constructed and arranged according to the invention.
Figure 2:
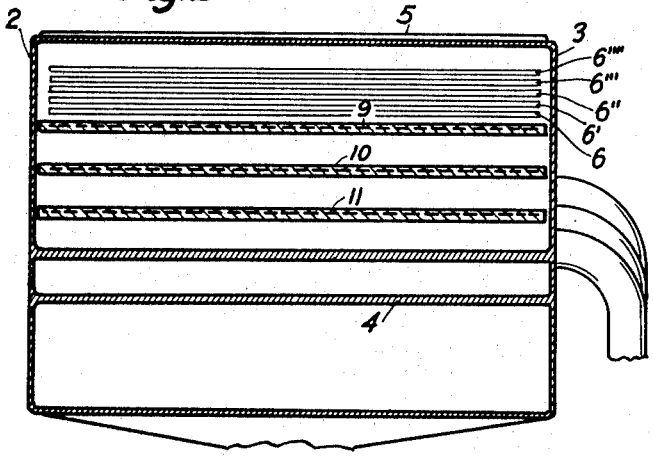
FIG. 2 is a section taken on the line II—II of FIG. 1.

Referring now to the drawings, and particularly to FIGS. 1 and 2 thereof, there is shown a feed hopper 1 which is capable of cleaning grit which has been used in the blasting of metal objects. Such grit, containing dust and particles of foreign matter, is fed to the hopper 1 by a bucket conveyor 40 which deposits the mixture or used grit in a chamber 39 within the hopper.

A swingable closure plate 41 is pivoted for tilting movement about an axis transversely of the hopper 1 and is normally held by a weight 42 in a position in which it closes the chamber 39 from the remainder of the hopper.

The plate 41, pivoted at one edge thereof, tilts gradually when a sufficient quantity of used grit is deposited in the chamber 39 so that the used grit can slide over the free edge of plate 41 into the remainder of the hopper, and specifically into the space 43. A series of substantially parallel graduated sorting screens 9, 10 and 11 extend downwardly at an angle in the space 43 which is defined, as shown in FIG. 2, by left side wall 2 and the right side wall 3 of the hopper, together with an inclined bottom plate 4 and an inclined cover 5. FIG. 1 shows that the cover 5 is provided with apertures 6, 6', 6", 6''' and 6'''' for the inlet of cleaning air into the space 43 upwardly of the uppermost screen 9.

The graduated sorting screens 9, 10 and 11 extend the full width of the hopper 1 from the left side wall 2 to the right side wall 3, being for instance mounted in brackets 7 of carrier 8, the upper edge of which terminates at the free transverse edge of the swingable closure plate 41 without, however, interfering with the movement of the latter.

The uppermost screen 9 is preferably made of perforated sheet metal having larger apertures therein than those of the middle screen 10, which in turn has larger apertures than the lower screen 11.

The bottom ends 12, 13 and 14 of the screens 9, 10 and 11, respectively, lie adjacent to partitions 15, 16 and 17 which form separate collecting channels 19, 20, 21 and 22 in the lower part 18 of the hopper 1, the discharge ends 23, 24, 25 and 26 of these collecting channels being provided with closure members 27, 28, 29 and 30, which can be independently opened and closed by the operator of the blasting machine.

Arranged in the upper portions 31, 32, 33 and 34 of the collecting channels are discharge orifices 35, 36, 37 and 38, which are connected with the bucket conveyor 40. These orifices are positioned in the respective collecting channels below the gaps which separate the lower edges 12, 13 and 14 of the screens 9, 10 and 11 from the upper edges of the partitions 15, 16 and 17, and prevent the material in the channels 19, 20, 21 and 22 from rising to a level which would close said gaps. The purpose of this transverse separation and of the gaps formed thereby will become apparent later.

Space 43 communicates with a separating chamber 44 located within the hopper on that side of the screens which is opposite the air inlet passages 6, 6', 6", 6''' and 6''''. The separating chamber 44 is connected near the top of the hopper 1 with an exhaust orifice 46 and has at its bottom a conduit 47 joined to an outlet pipe 48, which in turn is connected to the bucket conveyor 40. A conduit 49 leads from the exhaust orifice 46 of the separating chamber 44 to a first vortex separator 50 (see FIG. 7) which applies a vacuum thereto and also to the feed hopper via the exhaust orifice 46. Thus the vortex separator 50 draws a stream of cleaning air through the orifices 6, 6', 6", 6''' and 6'''' in the cover 5 of hopper 1.

Operation of the apparatus as already described will be easily followed. With the first vortex separator 50 in operation, air is drawn through the orifices 6–6'''' in the cover 5 of the feed hopper and passes into the space 43 containing the screens 9–11 and through such screens and between the free ends of the screens and the upper transverse edges of the partitions 15, 16 and 17. Since these spaces extend the entire width of the hopper a very thin layer of falling grit and dirt is presented to the air stream as the mixture slides along the screens 9–11 during which movement a first separation by screening already takes place, and the air stream is thus able to separate the dirt and dust from the grit. The air then enters the separating chamber 44, carrying with it small particles of useable grit in addition to the dirt and dust. It is obvious that these grit particles which have passed through the screens 9–11 are graded as to size by the various capacities of the screens, and are received in the separate collecting channels 19–22.

The rate at which the dust and grit laden air passes through the separating chamber 44 is considerably retarded because of the air capacity of that chamber, and accordingly the heavier grit particles fall by their own weight into the conduit 47 and from thence into the outlet pipe 48 which is connected to the bucket elevator 40.

The air, with the dust and the lighter grit particles entrained, passes through the exhaust orifice 46 and the conduit 49 to the first vortex separator 50 where it loses the heavier fraction of its load of grit, dirt and dust, such heavier fraction consisting mostly of grit and being discharged from the lower end of the first vortex separator 50 to one or more grit-blasting machines for use therein.

The lighter fraction consisting of dirt, dust and the remaining grit still entrained by the air stream, passes from the first vortex separator 50 under the action of an exhaust fan 52 through a suction tube 51 into the second vortex separator 53. Here, the heavier of the remaining entrained particles, mostly grit, are separated and fed through a discharge tube 69 to the bucket conveyor 40 for recirculation.

The exhaust tube 56 of the second vortex separator 53 is connected to a cyclone 57 which latter receives the remaining fraction entrained in the air stream and consisting entirely of dust and dirt. The exhaust tube of the cyclone 57 discharges to atmosphere, and its discharge pipe discharges the dirt and dust to a waste deposit area.

Attachable to the second vortex separator is at least one suction element for collecting all of the grit which has escaped from the blasting machine or machines. As shown in FIGS. 10 and 11, two suction elements 55 and 55' are preferably provided. However, more than two such elements may be provided if necessary or desirable. The suction elements 55 and 55' here shown are respectively connected to the second vortex separator 53 by means of suction hoses 54 and 54' which are coupled as at 64, 64' to a removable cover 63, connectable to the second vortex separator, when the suction elements are to be used.

By preventing the suction of the exhaust fan 52 from being applied to the first vortex separator 50, the vacuum of this fan may be used to apply the vacuum of the second vortex separator 53 to the suction elements 55 and 55' to thereby draw matter entering such elements into that separator. Means for this purpose, and for retaining the suction of the fan 52 within the second vortex separator 53, may comprise an elastic flap 58 closing the vortex separator 50 by bearing against the inlet of the suction tube 51 connected with the second vortex separator 53. Thus, all of the suction of the fan 52 is applied within the second vortex separator, and when the removable cover 63 is in place as shown in FIG. 7, this suction is applied through the suction hoses 54 and 54' to the suction elements 55 and 55'. FIGS. 10 and 11 illustrate how the suction hoses 54 and 54' are coupled to the removable cover 63.

The elastic flap 58 may be controlled from the operator's place of supervision of the apparatus by means of a cable 59 which passes over rollers 60 and 61 on top of the first vortex separator 50 and from there through the cover into the separator 50, where it is attached to the flap 58 (see FIGS. 8 and 9). Accordingly, by pulling the cable 59 it is possible for the operator to draw the flap 58 against the top of the first vortex separator 50 and to thereby control the operation of all of the elements of the machine. Conversely, by releasing his pull on the cable 59, the operator may allow the elastic flip 58 to fall into position against the end of the suction tube 51, thereby confining the suction of the exhaust fan 52 within the second vortext separator. Such an arrangement is illustrated in FIGS. 8 and 9 of the drawings.

The hopper 1, bucket conveyor 40, first and second vortex separators 50 and 53 are accommodated in proximity to either a single blasting machine or to a group of such machines, and in such a way that the hopper 1 is always positioned above the level of the working space of the blasting machines.

When the apparatus of the invention is used in connection with grit blasting machines of the nozzle type, the discharge portions 23, 24, 25 and 26 of the collecting channels 19, 20, 21 and 22 are connected to discharge hoses 65 to 65''' as illustrated in FIG. 5. The discharge hoses may open either into a single or a plurality of nozzle-type blasting machines.

FIGS. 3 and 4 illustrate the apparatus as applied to a plurality of blasting machines of the table- or drum-type in which chutes 66 to 66''' from the various blasting machines 67 to 67''' are connected so as to discharge into a common bucket conveyor 40 which carries the used grit, with impurities to the feed hopper 1. Supply conduits 68 to 68''' extend from the selected discharge portions 23–26 of the collecting channels 19 to 22 to corresponding blasting machines 67 to 67'''. Said selection is realized by means of an interposed multiway selector 70.

The connection may be made through hoses 65–65''', as illustrated in FIG. 5, or by rigid tubes. It is to be observed that each blasting machine 67 to 67''' may be supplied by anyone or all of the four hoses or tubes, if it is desired to effect the blast operation with different sizes of grit material in every machine.

Obviously, many structural modifications are possible without departing from the inventive concept. For instance, a larger number of screens may be provided, with a correspondingly larger number of collecting channels. Conversely all of the screens can be supplied with a single common collecting channel, or each of the screens can be supplied with more than one channel. Again, the discharge conduits coming from the collecting channels may not be connected to the blasting machine, but rather to storage containers in which the cleaned grit is collected for sale or other utilization.

Without further analysis, the foregoing will so fully reveal the gist of the present invention that others can by applying current knowledge readily adapt it for various applications without omitting features that, from the standpoint of prior art fairly constitute essential characteristics of the specific or generic aspects of this invention and, therefore, such adaptations should and are intended to be comprehended within the meaning and range of equivalence of the following claims.

What is claimed as new and desired to be protected by Letters Patent is set forth in the appended claims.

1. Apparatus for the continuous separation of particulate material from contaminants, comprising a container including a housing having a pair of spaced walls; a plurality of substantially parallel inclined stationary screens arranged within said container and comprising an upper screen facing one of said walls and a lower screen facing the other of said walls, the size of the apertures in said screens decreasing from said upper to said lower screen; supply means for continuously supplying a layer of a mixture of particulate material and contaminants to the upper end of said upper inclined screen for sliding movement over the latter in downward direction whereby some of said particulate material passes through said screens; collecting conduit means communicating with said screens for receiving particulate material which has passed therethrough; air supply means for passing a stream of air through said container from said one wall through said screens toward said other wall, whereby said stream of air entrains a mixture of at least some of said contaminants and some of said particulate material; and means for separating the entrained particulate material from said contaminants.

2. Apparatus as defined in claim 1, wherein said container has an upper portion and a lower portion in which said screens are arranged; and wherein said supply means comprises a plate member having a free edge and substantially closing said upper portion from said lower portion, said plate member being pivoted to said housing for movement between a first position in which is closes said upper portion from said lower portion, and a second position in which it is inclined relative to said first position, said supply means further comprising biasing means tending to maintain said plate member in said first position and feed means communicating with said upper portion for feeding a mixture of particulate material and contaminants onto said plate member whereby, when the weight of said mixture efficeeds the action of said biasing means, said plate member will pivot to said second position and the mixture thereon will flow over said free edge and onto said upper screen.

3. Apparatus as defined in claim 1, wherein said air supply means comprises air-inlet means provided in said one wall, air-outlet means provided in said other wall, and suction-producing means communicating with said air-outlet means for drawing air through said air-inlet means into said container.

4. Apparatus as defined in claim 3, wherein said suction-producing means comprises a vortex separator, and wherein said air stream and said mixture entrained therein are drawn into said vortex separator, some of said particulate material being separated from said mixture.

5. Apparatus as defined in claim 4; and further comprising conduit means connecting said vortex separator with said supply means for returning said separated particulate material to said container.

6. Apparatus as defined in claim 4; and further comprising an additional vortex separator connected with said first vortex separator for receiving said air stream and said mixture for separating the remainder of said particulate material from said contaminants.

7. Apparatus as defined in claim 6; and further comprising conduit means connecting said additional vortex separator with said supply means for returning said remainder of said particulate material to said container.

8. Apparatus as defined in claim 7; and further comprising a suction fan operatively connected with said additional vortex separator for aspirating said air stream and said mixture from said vortex separator.

9. Apparatus as defined in claim 8; further comprising aspirator means communicating with said additional vortex separator and arranged for aspirating particulate material and contaminants present in the vicinity of said apparatus; and diverter means for selectively diverting the suction produced by said suction fan from said vortex separator to said aspirator means to thereby enable the same to aspirate said particulate material and contaminants present in the vicinity of said apparatus for feeding into said additional vortex separator.

10. Apparatus as defined in claim 9; further comprising a conduit connecting said additional vortex separator with said vortex separator, said suction fan being connected with said additional vortex separator for normally aspirating said air stream and said mixture thereinto through said conduit; and wherein said diverter means comprises a closure member arranged for selectively closing said conduit whereby the suction produced by said suction fan is diverted to said aspirator means.

11. Apparatus as defined in claim 10; and further comprising remote-control means operatively connected with said closure member.

12. Apparatus as defined in claim 3; and further comprising means provided within said container for reducing the flow rate of said stream of air with said mixture entrained therein prior to passage through said air-outlet means to thereby cause relatively heavy particles of said particulate material to separate from said mixture by gravity.

13. Apparatus as defined in claim 12; and further comprising collecting means for collecting said relatively heavy particles.

14. Apparatus as defined in claim 1, wherein said collecting conduit means communicates with respective lower edges of said screens; and overflow aperture means provided in said collecting conduit means adjacent said lower edges for preventing backing-up of collected particulate material in said collecting conduit means beyond a predetermined level coincident with said overflow aperture means.

15. Apparatus as defined in claim 14, wherein said supply means comprises conveyor means; and further comprising pipe means connecting said overflow aperture means with said conveyor means for recirculating overflowing particulate material to said container.

16. Apparatus as defined in claim 15, wherein said conveyor means is a bucket-type conveyor.

17. Apparatus as defined in claim 15; and further comprising means provided within said container for reducing the flow rate of said stream of air with said mixture entrained therein prior to passage through said air-outlet means to thereby cause relatively heavy particles of said particulate material to separate from said mixture by gravity; collecting means for collecting said relatively heavy particles; and conduit means connecting said collecting means with said conveyor means for feeding said relatively heavy particles thereto.

References Cited

UNITED STATES PATENTS

| | | | |
|---|---|---|---|
| 573,706 | 12/1896 | Rossiter | 209—266 |
| 583,899 | 6/1897 | Ferguson | 209—318 X |
| 1,165,077 | 12/1915 | Sauerman et al. | 209—355 X |
| 1,391,073 | 9/1921 | Shoars | 209—246 X |
| 1,426,270 | 8/1922 | Fowler | 209—318 |
| 2,635,750 | 4/1953 | Hoyt | 209—144 |
| 2,648,532 | 8/1953 | Muller et al. | 209—144 X |
| 2,713,942 | 7/1955 | Rechenberg | 209—318 X |

FOREIGN PATENTS 78,153   9/1954   Denmark.

HARRY B. THORNTON, *Primary Examiner.*

TIM R. MILES, *Examiner.*